United States Patent [19]

Wallace

[11] Patent Number: 4,643,462

[45] Date of Patent: Feb. 17, 1987

[54] DOUBLE-LOOPED ROTATABLE COUPLER WITH TENSION STABILIZER

[75] Inventor: Norman R. Wallace, Walnut Creek, Calif.

[73] Assignee: Bechtel International Corporation, San Francisco, Calif.

[21] Appl. No.: 821,940

[22] Filed: Jan. 24, 1986

[51] Int. Cl.[4] .............................................. F16L 55/00
[52] U.S. Cl. .................................... 285/119; 285/272; 285/912; 141/387; 441/4
[58] Field of Search ............... 285/119, 136, 272, 912; 405/169, 170, 171; 166/359, 367; 441/4; 141/387

[56] References Cited

U.S. PATENT DOCUMENTS

| | | | |
|---|---|---|---|
| 2,823,074 | 2/1958 | Bernard | 285/136 X |
| 3,477,746 | 11/1969 | Watson | 285/119 |
| 3,909,047 | 9/1975 | Salmela | 285/119 |
| 4,186,763 | 2/1980 | Ferguson | 285/136 X |

Primary Examiner—Dave W. Arola
Attorney, Agent, or Firm—Townsend and Townsend

[57] ABSTRACT

A nonswiveling rotatable link formed from flexible conduits extending between two parallel planes of which one is rotatable relative to the other is stabilized without the use of a gear wheel mated to teeth on each of the two planes. The link instead includes two flexible conduits which together form two loops or circles, one on each plane. Each conduit also forms an arc traversing the gap between the planes, through which the conduit passes and reverses direction while transferring from one plane to the other as one plane rotates, the two arcs curving in opposite directions and overlapping to form a closed crossover loop. Tension within the crossover loop and thus proper alignment of the conduits is provided by pairs of idlers forced apart laterally inside the loop by a spring or cylinder mounting which maintains expansive pressure as conditions in the conduits cause the loop to expand or contract.

17 Claims, 6 Drawing Figures

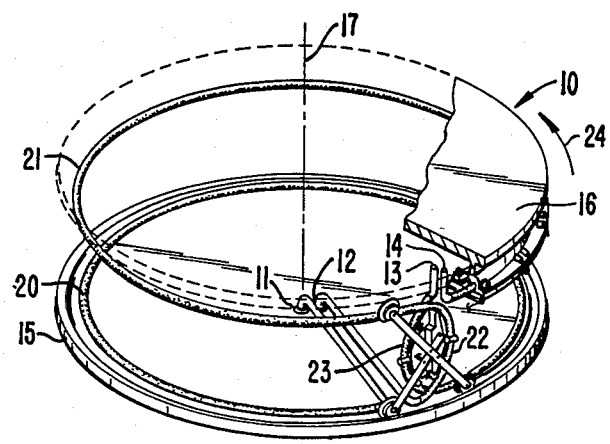
FIG._1A.
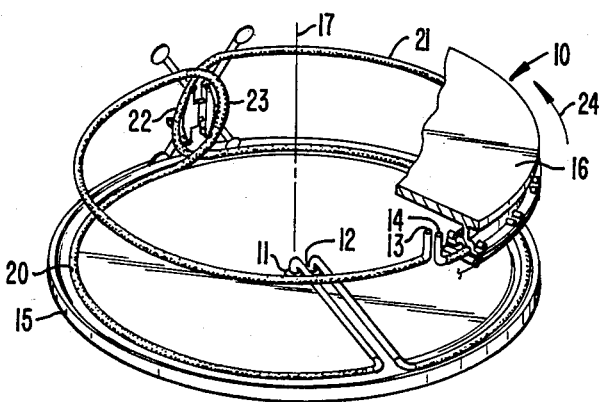
FIG._1B.
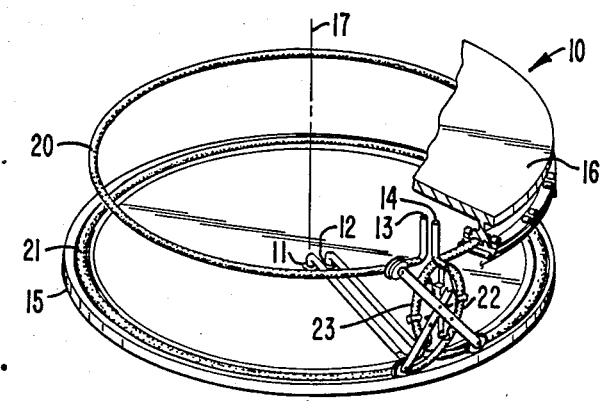
FIG._1C.

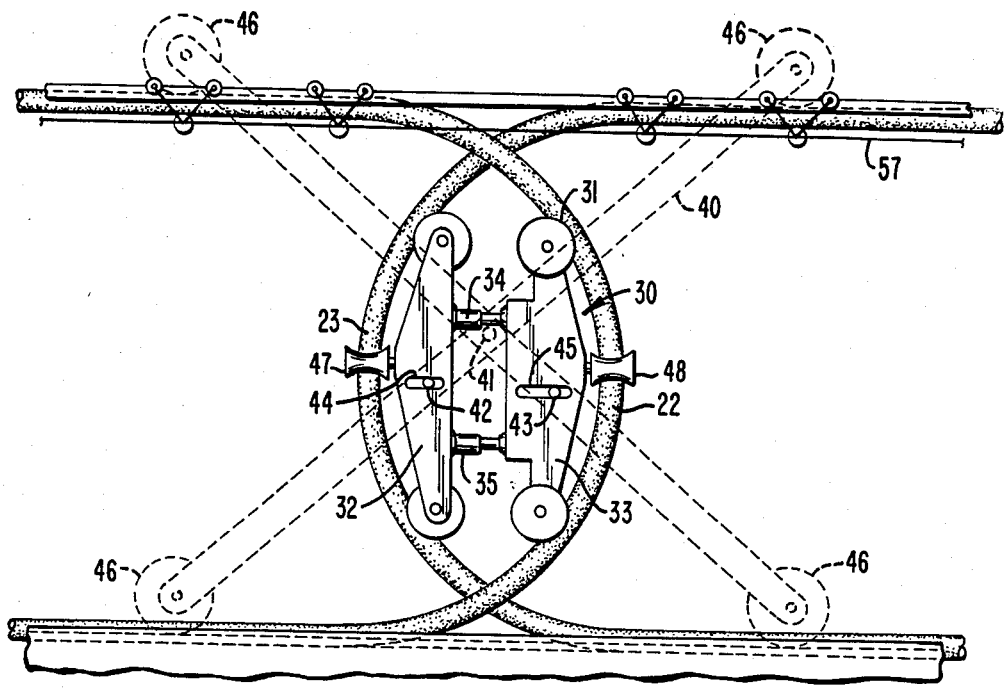
FIG._2.
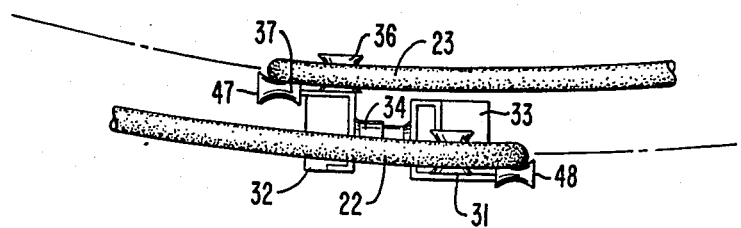
FIG._3.

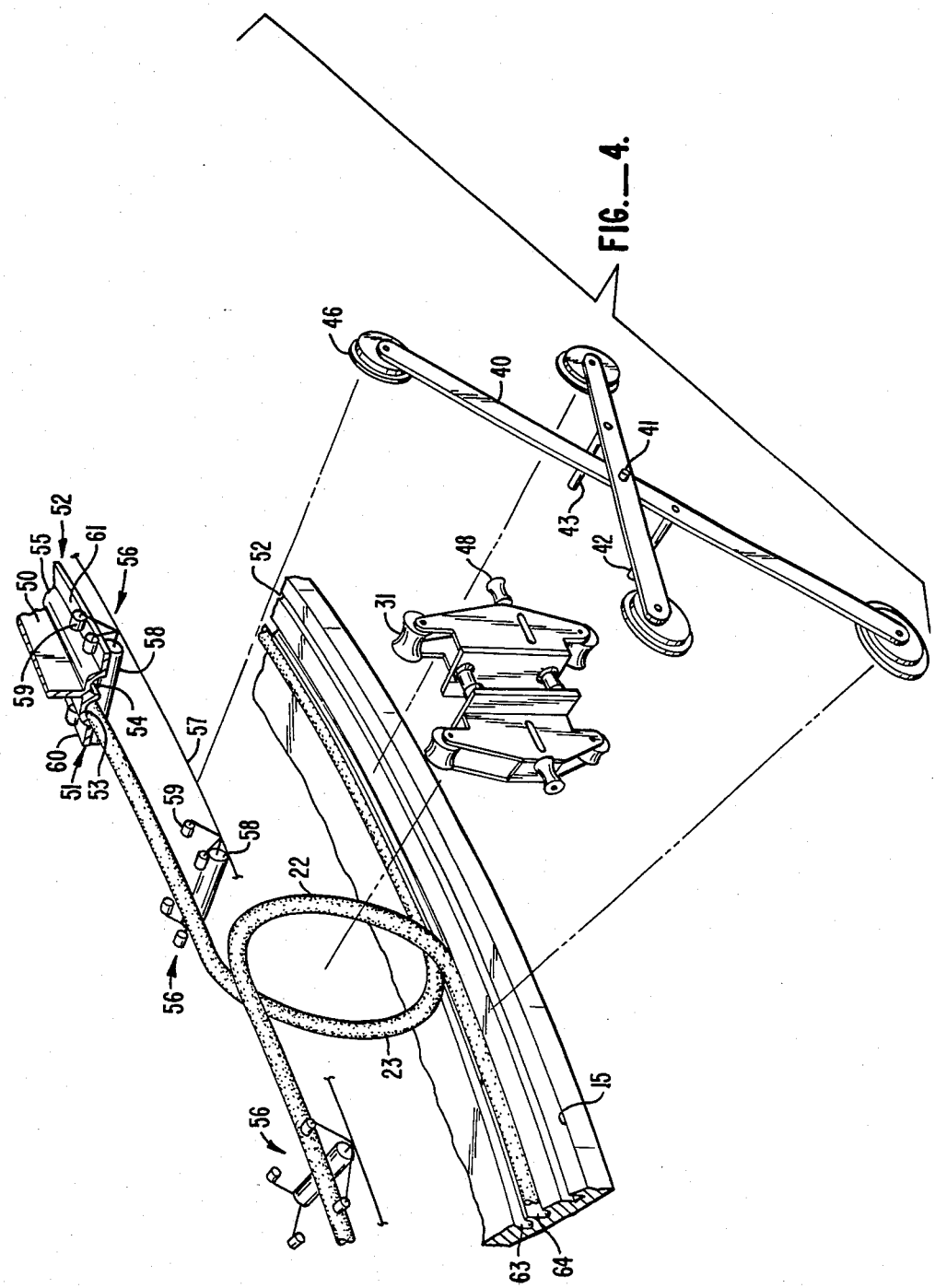
FIG._4.

DOUBLE-LOOPED ROTATABLE COUPLER WITH TENSION STABILIZER

BACKGROUND OF THE INVENTION

This invention relates to pipe couplers, and particularly to flexible conduits and their use in coupling together pipelines which are capable of rotating with respect to each other. This invention is of particular interest in equipment for offshore oil or natural gas extraction involving floating marine terminals which are rotated as wave directions change for purposes of maintaining stability.

A swivel-less coupling apparatus is disclosed in copending, commonly owned U.S. patent application Ser. No. 705,778, filed Feb. 26, 1985, now U.S. Pat. No. 4,597,595 to serve as a rotating link between a tubular riser column carrying oil or natural gas from a well on the ocean floor to a floating marine terminal. The apparatus is a replacement for swiveling links and flexible connectors previously used, eliminating sealing problems and mechanical stresses characteristic of swiveling links, and the limited range of rotation and other mechanical and geometrical problems characteristic of flexible connectors.

According to the disclosure of Ser. No. 705,778, the top of the riser column and the entry port of the pipeline on the floating vessel (facing downward) are secured in disc or ring-shaped elements in parallel horizontal planes which are spaced apart vertically, the upper plane (containing the vessel pipeline) fixed to the vessel and rotatable relative to the lower plane, following the rotation of the vessel. A flexible conduit connects the top of the riser column to the vessel entry port, the conduit being of sufficient length to rest on either of the two discs or rings, forming a wide circle around the axis of rotation. As one disc or ring rotates with respect to the other, the connecting conduit progressively uncoils from one and transfers to the other, forming an identical circle. Two complete revolutions are required for full transfer of the conduit from one plane to the other. Proper alignment during the transfer is maintained by a gear wheel over whose rim the conduit passes as it crosses over from one plane to the other. The gear wheel is positioned with its axis along the radius of the circle and the gear wheel itself travels around the periphery of the circle during rotation, mating with toothed tracks in the discs or rings.

The gear wheel has several disadvantages. First, it requires extra clearance beyond the circumference of the rotating element and it is typically located on the turret deck of a production vessel where space is at a premium. Second, it does not maintain tension on the crossover arc of the conduit when the arc expands due to hot fluids or high internal pressure. Third, the gear teeth require precise alignment and spacing for proper functioning of the wheel and the rotation of the elements.

SUMMARY OF THE INVENTION

Novel apparatus is now provided which avoids the need for a gear wheel and maintains tension while the conduit expands. Two flexible conduits are included, together forming complete loops or circles on both parallel planes. Rotation of one plane relative to the other causes one conduit to transfer gradually from one surface to the other while reversing direction as before, while the second conduit transfers from the second plane to the first. The crossover portions of both conduits overlap to form a closed crossover loop which travels in a circular path about the axis of rotation in the same manner as the single crossover arc did previously. Tension on each arc of the loop is maintained by a tension stabilizer inside the loop which applies radially expansive force on the loop, each arc thus applying a counter tension to the other. The loop carries the stabilizer along as the loop travels around the axis of rotation.

In preferred embodiments, the stabilizer consists of one or more pairs of idlers spring-mounted or piston-mounted together in a manner forcing them apart. The idlers in each pair are arranged horizontally inside the loop, thereby engaging both conduit arcs and urging them apart. Two or more pairs of idlers are particularly preferred for enhancing the stability of the structure. In further preferred embodiments, the stabilizer is mounted on a frame which engages each of the two support surfaces in a rolling manner. Retaining rails along each surface guide the frame along a circular path around the periphery of the conduits as they encircle the central axis of the device and hold the stabilizer at the center of the gap between the planes. Further idlers pressed against the outer planes of the crossover arcs, and thus perpendicular to the expanding idlers mentioned above, may be included to urge these arcs toward the central axis of the rotating planes, preventing them from protruding outward.

Further preferred embodiments and features of the invention are described below in connection with the drawings.

BRIEF DESCRIPTION OF THE DRAWINGS

FIGS. 1a, 1b and 1c are cutaway perspective views of one embodiment of the invention, showing the positions of the flexible conduits relative to each other in the two parallel planes and demonstrating their transfer between the two planes as one plane is rotated relative to the other.

FIG. 2 is a side elevation of an illustrative embodiment of the tension stabilizer of the present invention.

FIG. 3 is a plan view of the stabilizer shown in FIG. 2.

FIG. 4 is an exploded perspective view of the stabilizer shown in FIGS. 2 and 3.

DETAILED DESCRIPTION OF THE PREFERRED EMBODIMENTS

The coupling apparatus of the present invention is broadly denoted by the numeral 10 in the embodiment shown in FIG. 1a, where it is installed between a pair of inlet ports 11, 12, which may be the upper ends of a pair of riser columns (not shown) leading up from a well on the ocean floor, and a pair of outlet ports 13, 14, which may likewise be entry ports on a floating marine terminal (also not shown) leading to a hold. The inlet and outlet ports are in two parallel planes 15, 16, respectively. These planes are secured to each other in such a manner as to permit rotation of one relative to the other about a central axis 17. Thus, the lower plane 15 will remain fixed with respect to the riser column coming up from the ocean floor, whereas the upper plane 16 may be fixed with respect to the vessel, which will be rotated as required by the changing directions of the waves approaching the vessel.

The flexible conduits 20, 21 which connect the inlet ports to the outlet ports are shown laid out in circles around the axis of rotation 17 of the apparatus, one in or adjacent to each of the two planes 15, 16. Portions of the flexible conduits from crossover arcs 22, 23 which overlap to form a closed loop.

Due to the crossover configuration, the horizontal circles are of unequal diameter to permit each to transfer up or down independently of the other as one of the planes rotates.

FIG. 1b shows the position of the conduits and the crossover loop after the upper plane 16 has been rotated one full revolution toward the left (in the direction of the arrow 24), while FIG. 1c shows the position of the conduits after a second full revolution in the same direction. It will be noted that crossover arcs 22, 23 move together, maintaining a loop of constant shape circling the central axis in the same direction as that in which the upper plane rotates but at half the speed.

The closed loop formed by the overlapping crossover arcs is shown in an enlarged elevation view in FIG. 2. A tension stabilizer 30 is positioned between the two arcs, exerting lateral expansive tension on the arcs, tending to widen the loop. Expanding idlers 31 on the stabilizer contact the crossover arcs, pressing them horizontally outward. As the upper plane rotates, the crossover arcs 22, 23 roll in the same direction, either clockwise or counterclockwise. The expanding idlers 31 are in turn rolled by the arcs, thereby holding the tension stabilizer 30 inside the closed loop.

In the configuration shown, the closed loop is narrower in width than in height. Since the expanding idlers 31 are mounted for lateral expansion only, the device will remain upright as the conduits roll. Thus, although tension may be maintained by a single pair of idlers, two or more pair are preferred to help maintain the stabilizer in the upright position.

To provide expansive tension, the stabilizer is constructed of two halves 32, 33 connected to each other in a compressible resilient manner. This may be achieved by the use of conventional features such as a spring or a hydraulic cylinder under fluid pressure. In the embodiment shown in the drawings, two such hydraulic cylinders 34, 35 are shown. The cylinders, springs, or equivalent structure are mounted such that an outward force is continually exerted on the two halves 32, 33 of the stabilizer which in turn transmit the force to the crossover arcs 22, 23, and that such a force will be maintained upon expansion of the conduits (and the consequential widening of the closed loop formed by the crossover arcs) within the range expected during use.

The upright position of the stabilizer is further maintained by a frame 40 which contacts both the lower and upper planes 15, 16 in rolling contact. The frame in the embodiment shown in the drawings is a scissors-type frame with a pivot point 41 at its center to permit height adjustment. The stabilizer 30 is mounted to the frame at a height which is level with the loop formed by the crossover arcs 22, 23. Mounting is achieved by pins 42, 43 which extend from the stabilizer and mate with horizontal slots 44, 45, one located in each of the two halves 32, 33 of the stabilizer 30. The slots permit the two halves to move toward and away from each other while still holding them at a constant height.

Rollers 46 at the extremities of the frame permit travel of the frame along the lower and upper planes as the frame is pulled along by the idler mount 30. These rollers may be guided by grooves or rails in the two planes, which will in turn keep the idler mount in a circular path around the axis of rotation at the center of the apparatus (17 in FIG. 1). These are described in greater detail below.

The alignment of the crossover arcs with the circles formed by the flexible conduits in the two planes is further maintained by a pair of retaining idlers 47, 48, one pressing against the outer surface of each of the two crossover arcs 22, 23 in the direction toward the axis of rotation of the two planes.

The plan view of FIG. 3 shows the expanding idlers 31 and the retaining idlers 47, 48 from above. The expanding idlers in each pair are offset from each other as dictated by the displacement of the conduits. The contact surfaces 36, 37 of all idlers are concave to prevent lateral slippage of the conduits.

FIG. 4 provides a detailed view of the means by which the upper portions of the flexible conduits are held in place in the vicinity of the upper plane. A skirt 50, shown in cutaway, depends downward from the upper plane and follows the circles of the conduits. Extending laterally from the underside of the skirt on each side is a shoulder 51, 52, forming a pair of inverted troughs 53, 54 shaped to receive the two conduits. The upper side of the outer shoulder 52 contains a guide rail 55 to retain the upper wheels 46 of the carrier frame 40.

The conduits are held inside the inverted troughs 53, 54 by a series of retainers 56 spaced at intervals around the circumference of the apparatus. The spacing of these retainers is maintained by a cable or ring 57 which is free to rotate around the central axis at the same rate as the carrier frame. The crossover arcs 22, 23 of the flexible conduits are located between two adjacent retainers, permitting passage of the conduit into or out of engagement with the retainers as the entire apparatus rotates. Travel of the retainers 56 and hence the cable 57 may result either from the rolling of the crossover arcs as the system rotates (pushing the forwardmost of the two adjacent retainers in the direction of rotation), or alternatively by the carrier frame 40 should either the cable or the retainers on either side of the crossover region be secured to the frame.

The retainers 56 serve as hooks to engage the shoulders 51, 52 on either side of the skirt 50 depending downward from the upper plane. Each retainer contains a bottom roller 58 upon which rests the underside of the conduit, and upper rollers 59 which travel along ledges 60, 61 on the upper sides of the shoulders 51, 52.

The lower wheels of the frame carrier 40 are guided along the lower plane 15 by the guide rail 62 similar to the guide rail 55 on the upper plane. A pair of troughs 63, 64 in the lower plane 15 opening upward serve to receive and retain the flexible conduits as they are laid down during rotation of the system.

It is thus seen that the apparatus 10 avoids the need for meshed gears and careful gear alignment by substituting tensioned idlers which cause one crossover arc to stabilize the other as the two circle the central axis in the same direction. The idler mount and its carrier frame require a minimum of space and are able to accommodate variations in the conduit lengths upon expansion or contraction thereof due to temperature or pressure variations.

The assembly described herein and shown in the drawings can be combined with one or more additional such assemblies in a stacked arrangement with the conduits connected in series. The result will be three or more planes capable of rotation with respect to each other about a common central axis. The circles or arcs formed by the various connecting flexible conduits will all have centers along the axis, and each assembly will have a crossover region where the configuration and alignment of the conduits is maintained by a tension stabilizer with expanding and retaining idlers as described above. The resulting multiply-ganged assembly provides the system with the capacity to rotate in multiples of two full revolutions, thereby increasing the degree of rotational freedom accordingly.

The foregoing description is offered for illustrative purposes only. Numerous modifications and variations will be readily apparent to those skilled in the art, while still falling within the spirit and scope of the invention as claimed hereinbelow.

What is claimed is:

1. Apparatus for coupling first and second inlet ports in a first plane to first and second outlet ports respectively in a second plane parallel to said first plane and rotatable with respect thereto about an axis perpendicular to both, comprising:
   a first flexible conduit extending from said first inlet port to said first outlet port and of sufficient length to form a first substantially full circle around said axis;
   a second flexible conduit extending from said second inlet port to said second outlet port and of sufficient length to form a second substantially full circle around said axis;
   means for supporting portions of said first and second flexible conduits along arcs of said first and second circles respectively in both said first and second planes, whereby rotation of said second plane relative to said first plane causes one of said flexible conduits to uncoil from said first plane and coil onto said second plane, and the other of said flexible conduits simultaneously with the first to uncoil from said second plane and coil onto said first plane, the crossover portions of said flexible conduits overlapping to form a closed loop; and
   means for applying radially expansive tension to said loop, said means adapted to travel with said loop as said loop travels relative to said first and second planes while continuously maintaining said radially expansive tension.

2. Apparatus according to claim 1 in which said tension applying means is comprised of a pair of expanding idlers disposed inside said closed loop to urge said crossover portions apart.

3. Apparatus according to claim 2 in which said expanding idlers are urged apart by a piston.

4. Apparatus according to claim 1 in which said tension applying means is comprised of two pairs of expanding idlers disposed inside said closed loop to urge said crossover portions apart.

5. Apparatus according to claim 3 in which said expanding idlers in each said pair are urged apart by a piston.

6. Apparatus according to claims 2 or 4 in which said expanding idlers are rollers having concave surfaces in contact with said crossover portions.

7. Apparatus according to claim 1 in which one of said first and second substantially full circles is inside the other and said tension applying means includes a retaining idler pressed against the crossover portion of the outermost of said flexible conduits to retain said crossover portion within the substantially full circle defined by said outermost flexible conduit.

8. Apparatus according to claim 1 in which said tension applying means includes a first retaining idler pressed against the crossover portion of said first flexible conduit to retain said crossover portion within said first substantially full circle, and a second retaining idler pressed against the crossover portion of said second flexible conduit to retain said crossover portion within said second substantially full circle.

9. Apparatus according to claims 7 or 8 in which said expanding idlers are rollers having concave surfaces in contact with said crossover portions.

10. Apparatus according to claim 1 in which said first substantially full circle and said second substantially full circle have a common axis and are of different radii.

11. Apparatus according to claim 1 in which said tension applying means is mounted on a frame adapted to retain said tension applying means approximately midway between said first and second planes and further adapted to travel relative to said first and second planes as said second plane rotates.

12. Apparatus according to claim 11 further comprising means on each of said first and second planes for guiding said frame.

13. Apparatus according to claim 11 further comprising means on each of said first and second planes for guiding said frame, a first pair of rollers on said frame adapted to engage said frame guiding means on said first plane and a second pair of rollers on said frame adapted to engage said frame guiding means on said second plane.

14. Apparatus according to claim 11 in which said frame is a scissors frame.

15. Apparatus according to claim 1 in which said supporting means includes a pair of troughs in each of said first and second planes to receive said flexible conduits, the troughs in each said pair curved along said first and second substantially full circles, respectively.

16. Apparatus according to claim 15 in which said supporting means further includes a ring rotatably mounted to one of said first and second planes, and a plurality of retainers fixed to said ring at intervals along the circumference thereof to receive said flexible conduits.

17. Apparatus according to claim 16 in which each said retainer contains a roller positioned to hold said flexible conduit parallel to the plane to which said ring is mounted.

* * * * *